US012806888B2

(12) United States Patent
Azerraf et al.

(10) Patent No.: US 12,806,888 B2
(45) Date of Patent: Nov. 24, 2026

(54) WATER-VAPOR BARRIER PROPERTIES IN FOLDABLE MATERIALS

(71) Applicant: MELODEA LTD., Rehovot (IL)

(72) Inventors: Clarite Azerraf, Ashdod (IL); Yuval Nevo, Yavne (IL); Einav Kulbak, Kibbutz Tzora (IL); Tamir Moshe, Maccabim (IL); Rinat Eliyahu, Gan Shlomo (IL)

(73) Assignee: MELODEA LTD., Rehovot (IL)

( * ) Notice: Subject to any disclaimer, the term of this patent is extended or adjusted under 35 U.S.C. 154(b) by 215 days.

(21) Appl. No.: 18/697,653

(22) PCT Filed: Oct. 20, 2022

(86) PCT No.: PCT/IL2022/051108

§ 371 (c)(1),
(2) Date: Apr. 1, 2024

(87) PCT Pub. No.: WO2023/067602

PCT Pub. Date: Apr. 27, 2023

(65) Prior Publication Data

US 2025/0229513 A1 Jul. 17, 2025

Related U.S. Application Data

(60) Provisional application No. 63/264,620, filed on Nov. 29, 2021, provisional application No. 63/262,849, filed on Oct. 21, 2021.

(51) Int. Cl.

| | |
|---|---|
| ***B32B 27/10*** | (2006.01) |
| ***B32B 27/36*** | (2006.01) |
| ***B32B 29/08*** | (2006.01) |

(52) U.S. Cl.

CPC .............. *B32B 27/10* (2013.01); *B32B 27/36* (2013.01); *B32B 29/08* (2013.01); *B32B 2250/02* (2013.01); *B32B 2307/7246* (2013.01); *B32B 2307/73* (2013.01)

(58) Field of Classification Search

None

See application file for complete search history.

(56) References Cited

U.S. PATENT DOCUMENTS

| | | | | |
|---|---|---|---|---|
| 3,619,272 | A | 11/1971 | Shepherd et al. | |
| 5,155,160 | A | 10/1992 | Yeh et al. | |
| 5,795,932 | A * | 8/1998 | Dragner | C08L 91/06 524/277 |
| 2009/0098303 | A1 * | 4/2009 | Murphy | C09D 129/04 106/270 |
| 2010/0065235 | A1 * | 3/2010 | Fike | D21H 13/08 162/146 |

FOREIGN PATENT DOCUMENTS

| | | | |
|---|---|---|---|
| JP | 9-111696 | A | 4/1997 |
| JP | 2005162213 | A * | 6/2005 |
| WO | 98/54409 | A1 | 12/1998 |
| WO | 2010/077203 | A1 | 7/2010 |

OTHER PUBLICATIONS

Miyake, T., Wrapping Paper, Jun. 23, 2005, machine translation of JP2005-162213 (Year: 2005).*

Barbooti Mahmood M. et al, “Preparation and characterization of waste papers based composites and their applications in leather industries”, Al-Mustansiriyah Journal of Science, Aug. 15, 2019, vol. 30, Issue No. 1, pp. 184-192.

* cited by examiner

*Primary Examiner* — Chinessa T. Golden

(74) *Attorney, Agent, or Firm* — Vorys, Sater, Seymour and Pease, LLP; Maryellen Feehery Hank

(57) ABSTRACT

Provided is a non-metalized blank having superior barrier properties and processes for maintaining such properties.

20 Claims, No Drawings

WATER-VAPOR BARRIER PROPERTIES IN FOLDABLE MATERIALS

TECHNOLOGICAL FIELD

The invention generally contemplates foldable materials with improved water-vapor barrier properties.

BACKGROUND OF THE INVENTION

A critical function of packaging materials is to keep products safe from environmental, storage and shipment-related effectors which may damage the content of the packages and render them unusable. For example, without protective packaging, products can gain or lose moisture to such a degree that water content equilibrium is reached with the environment causing food products to become soggy or unsuitable for human consumption.

Thus, controlling moisture migration is crucial to maintaining stability and shelf-life of many products. Taste, texture, and overall quality of packaged food products and therapeutic agents' stability and effectivity may deteriorate over time when exposed to moisture. Water vapor can also have a deteriorating or destructive effect on electronic circuits and optical devices and thus require packaging that minimizes long term exposure to vapors. Thus, when choosing a packaging material, various factors must be considered and weighed to afford vapor barriers without imposing mechanical, chemical or otherwise manufacturing complexities and associated increase in cost. For example, thick packaging materials may reduce diffusion of moisture, but increase the weight of the product and cost of production and delivery. Forming multilayered structures may also reduce vapor penetration, but may equally increase the product weight and associated cost. Certain polymeric compositions exhibiting high vapor barrier properties may be prohibited for use with food or therapeutic products. Thus, there is a long felt need to achieve a barrier material that not only exhibits superior long term barrier properties and which can be implemented in a variety of products in an easy and cost-effective way, but also which may be safe for use in a variety of applications.

GENERAL DESCRIPTION

Vapor barriers limit the amount of water vapor diffusing through a physical barrier, typically due to different vapor pressures. Water-vapor barriers are made of materials or comprise such materials that reduce the rate at which water vapor can move through the material. However, as with any barrier, once a barrier film is imposed with accidental or intentional mechanical forces, such as those used for the purpose of reshaping or structuring, such forces can introduce cuts and tears, as well as creasings which decrease the barrier capabilities of the material at the mechanically modified or damaged or otherwise affected regions. The more damaged the barrier is, the lower is its ability to prevent diffusion of vapor and gases.

Creasing is a process used to convert flat blanks such as films or boards into 3D structures such as packages by enabling folding along well-predefined lines. By nature, creasing imposes damage to the blank, weakening the blank at the folding lines, also causing in-plane cracks and tears. Laminated blanks exhibiting increased barrier properties are similarly affected by creasing. Delamination at the purpose-formed folding lines has been demonstrated to greatly reduce the barrier capabilities, hence requiring a different approach.

The inventors of the technology disclosed herein have developed a novel means for improving water-vapor barrier properties in blanks such as films or boards, e.g., intended for use in packaging, whereby the barrier properties are not affected by an intentional creasing and are maintained over the full surface of the blank, including at the creased region.

Thus, in its broadest scope, the present invention provides a non-metalized blank, e.g., film or board, having a folding or a creasing pattern, wherein the blank is characterized by a barrier property (or a barrier profile), which may be reduced water vapor transmission rate (WVTR), reduced oxygen transmission rate (OTR) values, etc., that are maintained, are consistent or are substantially the same throughout the blank, including at the folding or creased region (namely at a region of the blank where the folding or creasing pattern is present).

One of the surprising features of the technology disclosed herein is a provision of constant or substantially unaffected barrier profile which is achievable by means disclosed herein. When endowing a naïve blank having a preselected material composition with barrier properties, mainly low or super low WVTR values, at a time prior to forming the folding or creasing pattern on the blank, the measured barrier properties are maintained unchanged after the pattern is formed. These properties are consistent and/or are substantially the same throughout the blank, including at the creased region or at any region that may be indirectly affected by the mechanical forces imposed onto the blank. A blank of the invention demonstrates or has a barrier profile or a water vapor transmission rate (WVTR) that is " . . . substantially constant throughout the blank surface, including at the folding pattern". In other words, the barrier property, one or more, e.g., WVTR properties, is maintained unchanged and substantially the same at any point along the blank, including at any point along the folding pattern. The terms "constant", "substantially constant", or "substantially the same" or any variation of the terms, are exchangeable and suggest that (i) the measured WVTR values or other barrier properties after formation of the folding or creasing pattern are the same as those measured for the same blank before the formation of the folding or creasing pattern, or are within 1, 2, 3, 4, 5, 6, 7, 8, 9, or 10% and that (ii) the measured WVTR values or other barrier properties at any two or more points along the blank, including along the folding pattern, are the same or within 1, 2, 3, 4, 5, 6, 7, 8, 9, or 10% from each other. For example, if WVTR is measured at a point along a non-creased region of the blank to yield a value of 1 $g/m^2$/day (measured at 38° C. and 90% relative humidity), a WVTR measured at a different point, within a creased region or a non-creased region, under the same conditions (i.e., at 38° C. and 90% relative humidity), should yield a value that is at most $1\pm0.1$ $g/m^2$/day.

The terms "constant", "substantially constant", or "substantially the same" or any variation of the terms, being exchangeable, further relate to barrier properties, e.g., WVTR properties, that are endowed by the presence of the at least one hydrophobic material, as further disclosed herein, and which are improved and superior to those measured for a naïve blank not comprising or formed of the at least one hydrophobic material. In some embodiments, the WVTR properties which are characteristic of blanks of the invention and which remain constant or substantially constant or the same are within a range of 1 and 20 $gr/m^2\cdot$day, when measured at 38° C. and 90% relative humidity, or are between 0.5 and 1 gr/m$^2$·day, when measured at 38° C. and 90% relative humidity.

In a first aspect, there is provided a non-metalized blank, e.g., film or board, having at least one mechanically induced folding pattern (at least one creasing pattern), the blank having a barrier profile, or a water vapor transmission rate (WVTR), that is the same or is substantially constant throughout the blank surface, including at the folding pattern.

Also provided is a non-metalized blank having at least one mechanically induced folding pattern, the blank comprising or being formed of at least one hydrophobic material and having a water vapor transmission rate (WVTR) that is between 1 and 20 gr/m$^2$·day, when measured at 38° C. and 90% relative humidity, at any point along the blank surface, including at the folding pattern, wherein the at least one hydrophobic material is selected from at least one wax, at least one modified wax, latex and mixtures thereof.

Further, the invention provides a non-metalized blank having at least one mechanically induced folding pattern and comprising at least one hydrophobic material selected from at least one wax, at least one modified wax, latex and mixtures thereof, the at least one hydrophobic material endowing said blank with a water vapor transmission rate (WVTR) between 1 and 20 gr/m$^2$·day, when measured at 38° C. and 90% relative humidity, wherein the WVTR is substantially the same throughout the blank surface, including at the folding pattern The blank of the invention is any flat, substantially 2-dimensional object that is typically in a form of a film or a board or a sheet and which is intended for use as packaging materials or as barrier surfaces for preventing vapor and/or gases from penetrating or permeating therethrough. The blank is a preprocessed object manufactured as a flat object endowed with preselected barrier properties, or having a predefined barrier profile, e.g., WVTR (and optionally with OTR) properties, in advance of any mechanical processing that purposes the blank for a particular use. The barrier properties, e.g., WVTR properties, as well as any of the other barrier properties exhibited by the blank of the invention, are due to the presence of at least one hydrophobic material, as defined herein, that is present in the bulk material composition forming the blank or which is provided on its surface or which is provided both in the bulk of the material and on its surface. The barrier properties are not derived from presence of any metallic film, as blanks of the invention are non-metallic objects, namely they are free of metallic layers (namely any metallic component that comprises a metal in a zero-valence form). While the blanks may be processed into a final product such as a packaging material that may require attachment of metallic elements, such elements are not present for the purpose of improving the object's barrier, e.g., WVTR or OTR properties.

Thus, in some embodiments, the blank is used in a method of manufacturing a packaging material. The packaging material formed of a blank of the invention is any physical structure intended for holding, containing or housing a material (e.g., being a liquid or a solid) or an object in a packed or unpacked form. To obtain the packaging material, the blank is provided with a folding or a creasing pattern designed to allow folding of the blank at predefined regions or along predefined lines. When referring to a packaging material, reference is made to a packaging structure or an article formed from a blank as defined herein.

Depending on the blank used, e.g., paper blank, polymeric blank, etc, as disclosed herein, the packaging material may be of any shape and size, may be printed or colored, may be fully transparent or opaque or may or may not be surface treated. The packaging material may be configured for packaging of goods, foods, liquids, pharmaceuticals, electronic devices or elements, vapor-sensitive objects or materials, batteries or any material requiring isolation or protection from water vapor present in the product environment.

Thus, in another aspect there is provided a non-metalized blank or packaging material having one or more panels or faces foldable along at least one mechanically induced folding pattern (at least one creasing pattern), the blank or packaging material having a water vapor transmission rate (WVTR) that is substantially constant throughout the material surface including at the folding pattern.

The invention further provides a non-metalized blank or packaging material having one or more panels or faces foldable along at least one mechanically induced folding pattern (at least one creasing pattern), the blank or packaging material being formed of a material comprising at least one wax, at least one modified wax, latex and mixtures thereof, wherein the blank or packaging material has a water vapor transmission rate (WVTR) that is substantially constant throughout the material surface including at the folding pattern.

Further provides is a non-metalized packaging material formed of a non-metalized blank, the packaging material having one or more panels or faces foldable along at least one mechanically induced folding pattern, the packaging material having a water vapor transmission rate (WVTR) that is substantially constant throughout the material surface including at the folding pattern, wherein the blank comprises or is formed of at least one hydrophobic material selected from at least one wax, at least one modified wax, latex and mixtures thereof.

In some embodiments, the panels or faces of the packaging materials are two or more substantially planar faces of the packaging material that are separated by a crease or a folding line or indentation, i.e., allowing folding along the folding line or indentation.

As stated herein, a blank of the invention is provided with a "folding pattern" or a "creasing pattern" which, despite it being formed by mechanical deformation of the blank, e.g., film or board, maintains the barrier properties exhibited by regions of the film or board not mechanically treated. The folding pattern is a portion of a surface of the blank wherein the structural strength of the material, from which the blank is formed has been weakened by mechanical means, such as compression, removal of material, displacement of material, reducing forces that hold the material together, such as by breaking fibers in a fibrous material, as well as by any combination of means. The pattern is typically composed of a single or a plurality of straight, curved, segmented or continuous lines, which may or may not be visible. In many instances, a line of weakness is used to assist in positioning a fold line in a blank. Further, in many instances, a folding pattern is visible to the naked eye.

While typically folding patterns are used to direct and enable facile folding of the blank, such patterns may also be utilized to strengthen the material in a direction perpendicular to a folding line, or may be used for decorative purpose, or may be used to color-pattern an object by filling a creasing line, etc.

In some embodiments, the folding or creasing pattern is formed by mechanical compression or by displacing a portion of the material vertical to the plane of the blank, forming a groove or trough in the blank. The compression or displacement may involve use of a compression tool, such as a roller.

The formation of the folding pattern or creasing pattern by, e.g., compression, may yield indirect damage to the blank, a damage which despite its existence does not substantially influence the barrier properties of the blank. In other words, the invention also provides means to protect a blank against tears and cracks formed when producing softly folded structures such as pouches, which involve soft deformations of the blank, without the involvement or a creasing.

Different commercial blanks used in the manufacture of packaging materials, as well as packaging materials formed of such blanks have been tested for their barrier properties. In all cases, the presence of creases and/or cracks formed during manufacturing of the packaging materials from their respective blanks, through the imposition of folding lines, severely affected the barrier properties as compared to the uncreased blanks. As data presented herein demonstrates, blanks formed from a composition comprising at least one of the hydrophobic materials disclosed herein, namely at least one wax, at least one modified wax, latex or combinations thereof, or blanks coated with a film of the at least one of the hydrophobic materials, provided protection from mechanical damage and maintained the barrier properties, e.g., WVTR and optionally OTR values, at the creasing lines, consistent or substantially the same as the same properties when measured at any other uncreased region of the blank. While WVTR values at a folding line of a commercial product was measured to be between 50 and several hundred g/$m^2$/day (measured at 38° C. and 90% relative humidity), and at times several orders of magnitude higher than the measured WVTR at regions other than the folding line, products of the invention exhibited WVTR values that were not only dramatically lower, ranging between 1 and 20 g/$m^2$day (measured at 38° C. and 90% relative humidity), or lower than 1 g/$m^2$day, but also exhibited the same value at any mechanically imposed folding or creasing that was present. Putting it differently, blanks or packaging materials of the invention differ from those commercially available in at least:

(i) WVTR values measured at any region of the blank or packaging material that are superior, e.g., being lower than 1 or between 1 and 20 g/$m^2$day (measured at 38° C. and 90% relative humidity); and (ii) WVTR values measured at any region of a folding or creasing pattern or region that are superior, e.g., being lower than 1 or between 1 and 20 g/$m^2$day (measured at 38° C. and 90% relative humidity); and (iii) WVTR values measured at any region of a folding or creasing pattern or region that are the same or substantially the same or within 10% of the values measured at any other region of the blank or packaging material.

The improved superior barrier properties and the fact that such properties were unaffected by the mechanical deformation of the blank are due to the use of at least one hydrophobic material selected from wax, modified wax, latex and mixtures thereof that are used in the manufacturing of the blanks, and thus are present in the composition making up the blanks and/or that are used to form a thin material layer on a blank not exhibiting such barrier properties.

The blank used in manufacturing a creased blank of the invention may be a polymeric blank, a paper or paper-based blank, a polymer coated paper-based blank, e.g., a paperboard, a nanocellulose blank, a nanocellulose/polymer blank, a fabric-based blank, a porous blank, and others.

In some embodiments, the blank is composed of a polymeric material. The polymeric material may be a material belonging to any known polymeric family of materials or resin, such as thermoplastic polymers and thermoset polymers. The polymer may be selected amongst such polymers as polyethylene, polypropylene, polyvinyl alcohol, ethylene vinyl alcohol, polyamide, polystyrene, polylactic acid, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride and polycarbonate. In some embodiments, the polymeric material is polyester.

In some embodiments, the polymer is selected from polyethylene, polypropylene, polyester, polyvinyl alcohol, ethylene vinyl alcohol, polyamide, polystyrene, polylactic acid, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride and polycarbonate, or any blend of two or more thereof.

In some embodiments, the blank is a paper blank or a paper-based blank. The paper or paper-based material used may be in a paper material known in the art. The paper blank may be used as is or may be coated with a polymer on one or both its faces.

In some embodiments, this paper-coated blank is a paperboard.

In some embodiments, the paper blank is Kraft paper. As known in the art, Kraft paper is a paper or paperboard (cardboard) produced from chemical pulp produced in the Kraft process, as known in the art. The paper is a porous paper with high elasticity and high tear resistance, designed for packaging products with high demands for strength and durability.

In some embodiments, the paper blank is selected from bank paper, banana paper, bond paper, book paper, coated paper products, construction paper, sugar paper, cotton paper, fish paper, inkjet paper, Kraft paper, Sack Kraft paper, laid paper, leather paper, mummy paper, oak tag paper, sandpaper, Tyvek paper, wallpaper, Washi paper, waterproof paper, wax paper, wove paper, Xuan paper and others.

As known in the art, commercial papers or paper-based products of any kind described above, may contain additives such as clays, calcium carbonate, latex, etc., which are added to the paper in its production process.

In some embodiments, the blank is a fabric-based blank that is flexible and constructed of a network of natural or artificial fiber materials. The fabric blank may be any textile, natural fabric, synthetic fabric, knit, woven material, non-woven material or mesh of a material selected from cellulose, viscose, glass fibers, carbon fibers and synthetic fibers. In some embodiments, the fabric blank may be in the form of a porous material or a membrane, selected as indicated.

In some embodiments, each of the blanks of the invention is formed of a bulk material and an amount of the hydrophobic material, e.g., at least one wax, and/or at least one modified wax and/or latex. In other words, a blank of the invention may be a polymeric blank, a paper or paper-based blank, a polymer coated paper-based blank, e.g., a paperboard, a nanocellulose blank, a nanocellulose/polymer blank, a fabric-based blank, a porous blank, or others, which comprises an amount of at least one wax, and/or at least one modified wax and/or latex. The at least one hydrophobic material, as defined herein, may be added into the blank composition during manufacturing of the blank.

For example, to provide a paper-based blank or a paperboard with superior WVTR and optionally OTR properties, as disclosed herein, the inventors have introduced a modification to a paper-processing or paper production process. While the barrier properties may be achievable by lamination of the paper blank with a plastic film or by covering the paper blank with multiple material layers to decrease permeation therethrough of gases and ambient humidity, superior barrier properties may be achievable in a single, unlaminated sheet of a paper blank. Accordingly, a paper blank or a paperboard according to the invention may be manufactured by treating a pulp material used in the production of paper with a formulation comprising a hydrophobic material selected from at least one wax, modified wax and/or latex, as defined herein.

Alternatively, the pulp material may be treated with any of the following for achieving a paper blank or paperboard, as defined herein:

(a) at least one polymer, optionally selected from polyvinyl alcohol, polyvinyl acetate, latex, wax, modified wax and others;

(b) at least one additive, optionally selected from nanocellulose, micro fibrillated cellulose, nano fibrillated cellulose, cellulose derivatives, lignin, chitin nano particles, chitosan, iron particles, ascorbic acid, nano clays, oxygen scavengers, adhesive promotors, and others;

(c) at least one filler, optionally selected amongst clays, starch and others;

(d) at least one surfactant and defoamer, optionally selected from Twin, Span, SDS, C-TAB, Surfynol440 (defoamer), fatty acids, cellulose ethers and others.

As used herein, a "pulp" is any paper making pulp known in the art. Generally, pulp is a lignocellulosic fibrous material obtained by chemically or mechanically separating cellulose fibers from wood, fiber crops and plants, wastepaper, rags and other carbon-rich materials. The pulp used for paper making may be a processed or an unprocessed pulp, which is produced from non-wood or recycles products.

In some embodiments, the non-metalized paper blank or paperboard or paper-based packaging material having at least one mechanically induced folding pattern (at least one creasing) comprises a hydrophobic material selected from at least one wax, at least one modified wax, latex and mixtures thereof, wherein the material is embedded or mixed or intercalated into the blank or paperboard or packaging material during manufacturing, and wherein the blank or paperboard or packaging material having a water vapor transmission rate (WVTR) that is substantially constant throughout the material surface including the folding line.

In some embodiments, the hydrophobic material is embedded or mixed or intercalated in the paper film or paperboard or paper-based packaging material in a paper manufacturing process comprising adding to a bleached or unbleached pulp an amount of the hydrophobic material (e.g., at least one wax, at least one modified wax, latex and mixtures thereof).

In some embodiments, the paper manufacturing process comprises treating a pulp composition configured or selected for use in making a paper blank with at least one wax, at least one modified wax, latex or mixtures thereof.

In some embodiments, the at least one wax, at least one modified wax, latex or mixtures thereof may be added to the pulp by casting, spraying, or coating. It may alternatively be added to the initial pulp composition, before further processing, or by addition during the paper manufacturing process.

In some embodiments, the at least one wax, at least one modified wax, latex or mixtures thereof may be added during pulp moldings, in a creation of a simple/complex paper structure.

In other embodiments, the paper-manufacturing process comprises a step of associating or attaching a pulp composition to a substrate, while maintaining the barrier properties, to produce pulp-pulp, paper-paper, pulp-paper, pulp-plastic, paper-plastic and/or plastic-plastic structures.

Further provided is a pulp composition suitable for use in paper production, the composition comprising at least one wax, at least one modified wax, latex or mixtures thereof.

In some embodiments, blanks of the invention comprise at least one hydrophobic material that is not a wax material or is not latex.

The at least one wax, at least one modified wax, latex or mixtures thereof may be generally added to the pulp composition at any amount. However, in some embodiments, the material or mixture of materials added comprises between 5 and 70% solids. The amount of the additives added in combination may be between 0.1 and 50% of the total solids. The amount of surfactants and antifoams may be between 0.1 and 20% of total amount of solids.

The addition of the at least one wax, at least one modified wax, latex or mixtures thereof to the pulp during the paper manufacturing processes, improves the paper's oxygen and/or water vapor performances, with no additional coating necessary, while achieving a uniform barrier.

The addition of the at least one wax, at least one modified wax, latex or mixtures thereof also improves other paper properties such as air permeability, tear and burst index and tensile strength. Moreover, reduction in paper surface roughness is observed.

The invention further provides a paper sheet or a paper product or a paper blank formed from a pulp of the invention.

Further provided is a paper sheet or a paper product or a paper blank in a non-laminated form having oxygen and water vapor properties, wherein the paper sheet or paper product comprises at least one hydrophobic material as defined herein.

Alternatively to manufacturing paper-based blanks, paperboards and paper-based packaging materials which are formed of a pulp composition comprising the hydrophobic material, WVTR and OTR properties may be endowed to a paper blank and to any other blank disclosed herein by forming a layer or a film comprising the at least one wax, at least one modified wax, latex or mixtures thereof onto the material blank. Thus, in a process of the invention, a blank is formed by coating a substrate blank or a naïve blank with a layer or a film comprising at least one wax, at least one modified wax, latex or mixtures thereof and mechanically forming the folding or creasing pattern on the blank.

The layer or film, which may be regarded as a laminating layer or film may be formed by applying a formulation or an emulsion, e.g., an aqueous emulsion, comprising the hydrophobic material onto a surface region of a blank to thereby endow the blank with the barrier properties. In some embodiments, the blank may be any of the blanks disclosed herein and the application of the formulation or emulsion onto its surface may be by any film-forming means known in the art. Irrespective of the type of hydrophobic material the blank, a film formed on the blank is typically of a thickness corresponding to a weight value of between 3 and 13 g/$m^2$. In some embodiments, the weight value is between 3 and 10, 3 and 8, 3 and 6, 5 and 15, 5 and 10, 5 and 8, 7 and 15 or between 7 and 10 g/$m^2$. In some embodiments, the weight value is 5 and 10 g/$m^2$.

The laminated blank (namely the blank having a layer or a film of the hydrophobic material on its surface) may also be used as a substrate for forming a multilayered structure, wherein the film of the at least one wax, at least one modified wax, latex or mixtures thereof is one of the layered structures, not necessarily an external layer thereof.

Thus, a blank of the invention may be selected from:

(1) a blank formed of a material composition (e.g., polymeric composition, paper-based composition, a nanocellulose composition, a fiber, etc) further comprising at least one wax, at least one modified wax, latex or mixtures thereof, for example a paper blank, formed of a bulk material, e.g., a polymeric material, a paper pulp material, etc, and at least one wax, at least one modified wax, latex or mixtures thereof;

(2) a blank of a material (e.g., polymeric blank, a paper or paper-based blank, a polymer coated paper-based blank, e.g., a paperboard, a nanocellulose blank, a nanocellulose/polymer blank, a fabric-based blank, a porous blank, or others) coated with a film of a material comprising or consisting an amount of at least one wax, and/or at least one modified wax and/or latex;

(3) a blank of a material (e.g., a polymeric blank, a paper or paper-based blank, a polymer coated paper-based blank, e.g., a paperboard, a nanocellulose blank, a nanocellulose/polymer blank, a fabric-based blank, a porous blank, or others) coated with a film of a material comprising or consisting an amount of at least one wax, and/or at least one modified wax and/or latex and formed into or provided as a multilayered or a few-layered (comprising between 2 and 5 layers) structure; and (4) a blank which is a combination of any of (1) and/or (2) and/or (3) above.

The at least one "wax" used may be any wax material known in the art. In most general terms, the wax may be a long chain ester or a long chain hydrocarbon.

In some embodiments, the at least one wax is a long chain ester that is a product of a long chain alcohol and a fatty acid. Typically, this wax is derived from an alcohol having at least 12 carbon atoms, and in some case having up to 40 carbon atoms.

In other embodiments, the at least one wax is a paraffin wax obtained by petroleum dewaxing processes. Unlike the ester waxes, the paraffin wax is a hydrocarbon or a mixture of hydrocarbons containing between 20 and 40 carbon atoms. In some embodiments, the paraffin wax is a branched hydrocarbon, or a mixture of hydrocarbons of different lengths, comprising at least one branched hydrocarbon. In some instances, the paraffin wax may also comprise a non-aliphatic material, such as an aromatic-based material.

Non-limiting examples of waxes include naturally derived waxes, synthetic waxes, and semi-synthetic waxes. In some embodiments, the at least one wax is selected amongst sustainable waxes. The sustainable waxes are those which provide environmental, social and economic benefits and impose no environmental or public health risks. The sustainable waxes may be selected from carnauba wax, vegetable wax, beeswax, coconut wax, Candelilla wax, soy wax and others.

In some embodiments, the at least one wax is carnauba wax or vegetable wax or beeswax or coconut wax or Candelilla wax or any other wax known in the art.

In some embodiments, the at least one wax is a mixture of two or more waxes, being optionally selected from waxes disclosed herein.

The at least one modified wax is a material that is based on a wax material, as defined herein, yet is chemically modified to associate to at least one functional material. The "modified wax" is thus a conjugate of at least one wax and a functional material. The modified wax is generally produced from the unmodified precursor or from other precursors to provide modified materials having more desirable properties than are known for the unmodified wax material. The modified properties may be modulated relative to the same properties in the unmodified wax, or new properties not existing in the unmodified wax or such properties that are eliminated or reduced relative to the unmodified wax. The modulation of the properties may result in enhancement or lessening of the properties.

The functional material conjugated to the wax to yield the modified form may be any such material capable of inducing modulation of properties. Such functional materials may be selected from hydrocarbons, polysaccharides, proteins, amino acids, aliphatic materials, lipids, acrylic polymers, thermoplastic polymers, polyolefin polymers such as PE, PP, and others. In some embodiments, the functional material is a polymer. Non-limiting examples include ethylene-vinyl acetate (EVA), polyethylene (PE), polypropylene (PP), polycarbonate (PC), polyethylene oxide (PEO), ethylene acrylic acid (EAA) and others.

In some embodiments, the functional material is cellulose or a cellulose-material (such as carboxyl methylcellulose (CMC), cellulose nanocrystal (CNC), microcrystalline cellulose (MCC), microfibrillated cellulose (MFC) and others, starch, rosin, nylon and others.

The properties to be modified may be melting point, solubility, thermal stability, density, viscosity, thermal softening, and other mechanical or chemical properties. In some embodiments, the properties may be OTR and/or WVTR. In other words, in some embodiments, a modified wax is provided having improved OTR and/or WVTR properties.

In some embodiments, the modified wax is EVA-modified wax.

In some embodiments, the modified wax is an EVA-modified paraffin wax. EVA-modified paraffin is a material prepared by a chemical reaction between paraffin wax and EVA. The EVA grade and ratio of EVA to paraffin affects the resulted properties, such as softening temperature, mechanical properties, etc. Generally, the modified wax shows comparable range of softening and melting temperatures to paraffin wax (50-65° C.). The mechanical stability of the EVA modified wax is significantly higher than that of paraffin wax and is increased as EVA content goes higher. EVA modified wax also shows significantly higher adhesiveness capabilities than paraffin wax. EVA-modified waxes may be prepared according to procedures known in the art and as exemplified herein.

The latex used in products of the invention is typically derived from rubber trees as a milky liquid comprising 55% water and around 40% rubber material. Its chemical composition is a polymer of cis-1,4-polyisoprene having a molecular weight of 100,000 to 1,000,000 Da, with a small amount of material such as proteins, fatty acids, resins, and inorganic materials. The latex used in products of the invention is a non-coagulated form (e.g., not a coagulated rubber material, nor a vulcanized rubber). Alternatively, the latex may be synthetically prepared from petroleum-based chemicals.

Thus, in some embodiments, a blank or a packaging material of the invention is a non-metalized blank or formed of a non-metalized blank comprising at least one wax, or at least one modified wax, e.g., wherein the at least one wax, or at least one modified wax is mixed in the blank composition or is provided as a film on the blank.

In some embodiments, a blank or a packaging material of the invention is a non-metalized blank or formed of a non-metalized blank comprising latex, e.g., wherein the latex is mixed in the blank composition or is provided as a film on the blank.

In some embodiments, a blank or a packaging material of the invention is a non-metalized blank or formed of a non-metalized blank comprising at least one wax and/or at least one modified wax and latex, e.g., wherein the at least one wax, and/or at least one modified wax and latex is mixed in the blank composition or is provided as a film on the blank.

In some embodiments, a blank or a packaging material of the invention is a non-metalized blank or formed of a non-metalized blank comprising two or more or a mixture of waxes, e.g., wherein the one or more waxes is/are mixed in the blank composition or is/are provided as a film on the blank.

In some embodiments, the blank of the invention comprises at least one wax and latex, wherein optionally the amount of the wax is at least 10 wt % relative to the amount of the latex.

In some embodiments, the blank of the invention comprises at least one modified wax and latex, wherein the modified wax is optionally EVA-modified wax.

In some embodiments, the blank of the invention comprises at least one additive, as disclosed herein.

In some embodiments, a blank of the invention is a paper-based blank comprising a sheet of a dry pulp composition and the at least one hydrophobic material.

In some embodiments, a blank of the invention is a paper-based blank comprising a sheet of a dry pulp composition and a layer of the at least one hydrophobic material.

In some embodiments, a blank of the invention may be a paper-based blank comprising a sheet of a dry pulp composition and the at least one hydrophobic material and a layer of the at least one hydrophobic material, wherein the at least one hydrophobic material present in the pulp composition and the at least one hydrophobic material present in the layer are same or different.

In some embodiments, the at least one hydrophobic material present in the pulp composition and the at least one hydrophobic material present in the layer are the same, selected from at least one wax, or at least one modified wax or latex.

In some embodiments, the at least one hydrophobic material present in the pulp composition and the at least one hydrophobic material present in the layer are different, each independently selected from at least one wax, at least one modified wax or latex.

The invention further provides a process for manufacturing a blank or a packaging material having at least one folding or creasing pattern, the process comprising forming a blank or a packaging material comprising at least one wax, at least one modified wax and/or latex, said blank having preselected barrier properties, e.g., WVTR, OTR, and mechanically forming said folding or creasing pattern, wherein following the mechanical forming of the pattern, the preselected barrier properties are maintained throughout the surface of the blank or packaging material, including at the folding or creasing pattern.

The invention further provides a process for maintaining at least one barrier property of a blank or a packaging material having preselected barrier properties at a time prior to forming a folding or creasing pattern in the blank or packaging material, the process comprising forming a blank or a packaging material comprising at least one wax, at least one modified wax and/or latex, the blank or packaging material having preselected barrier properties (endowed by said at least one wax, at least one modified wax and/or latex), and mechanically forming said folding or creasing pattern, wherein following the mechanical forming of the pattern, the preselected barrier properties are maintained throughout the surface of the blank or packaging material, including at the folding or creasing pattern.

The invention further provides a process for minimizing or diminishing transmission of water vapors through a packaging material blank imposed by compression or creasing, the process comprises forming a blank of a packaging material comprising at least one wax, at least one modified wax and/or latex, to thereby endow said blank or packaging material with a preselected water vapor barrier property and mechanically forming a folding or a creasing pattern, wherein following the mechanical forming of the pattern, the preselected barrier property is maintained throughout the surface of the blank or packaging material, including at the folding or creasing pattern. In some embodiments, the preselected barrier property is WVTR.

In some embodiments, the preselected barrier properties are achievable by:

(i) mixing at least one wax, at least one modified wax, latex or mixtures thereof in a process for manufacturing the blank; or (ii) laminating or forming a film or a coat onto a blank absent of the preselected barrier properties, wherein the laminate or film comprising the at least one wax, at least one modified wax, latex or mixtures thereof.

In some embodiments, the at least one wax, at least one modified wax, latex or mixtures thereof is provided in a formulation or an emulsion further optionally comprising at least one additive.

The at least one additive may be a surfactant (such as fatty acids, Span, Tween, sucrose ester-based surfactants, SDS, and others), a salt (organic or inorganic), an adhesive, an emulsifier, a stabilizer, a pH stabilizer, an anti-blocking agent, a defoamer, a colorant, clay, a cellulosic material, a polymer (such as hydrophobic polymers), lignin, starch, Shellac, MFC and others.

The concentration of the at least one wax, at least one modified wax, latex or mixtures thereof in an aqueous formulation or emulsion comprising same may be between 5 and 70 wt %. In some embodiments, at least one additive may be present at a concentration that is between 0 and 50 wt %. Surfactants may be present at a concentration between 0.1 and 20 wt % of the overall solid content.

Excluded from additives that may be used are formaldehydes and any other component that are not food-grade, or which are not environmentally friendly or which are generally toxic.

The invention further provides a process of forming a creasing or a folding pattern in a blank or a packaging material exhibiting a barrier property without substantially changing or modifying or affecting the barrier property subsequent to forming of the creasing or folding pattern, the process comprising compressing (or using any other creasing or folding method disclosed herein) a patterned region of a blank or a packaging material comprising or formed of at least one wax, at least one modified wax and/or latex or mixtures thereof and characterized by or exhibiting the barrier property, wherein subsequent to forming of the creasing or folding the barrier property remains substantially the same or remains unchanged throughout the blank or packaging material.

In some embodiments, the process comprising forming the blank or packaging material, e.g., by a method disclosed herein.

Further provided is a process for manufacturing a blank or a packaging material having at least one folding or creasing pattern, the process comprising forming a blank or a packaging material comprising at least one wax, at least one modified wax and/or latex, said blank having preselected barrier properties; and mechanically forming said folding or creasing pattern on a surface region of the blank or a packaging material, wherein following the mechanical forming of the pattern, the preselected barrier properties are maintained throughout the surface of the blank or packaging material, including at the folding or creasing pattern.

A process is also provided for maintaining at least one barrier property of a blank or a packaging material having preselected barrier properties at a time prior to forming a folding or creasing pattern in the blank or packaging material, the process comprising forming a blank or a packaging material comprising at least one wax, at least one modified wax and/or latex, the blank or packaging material having preselected barrier properties, and mechanically forming said folding or creasing pattern, wherein subsequent to the mechanical forming of the pattern, the preselected barrier properties are maintained throughout the surface of the blank or packaging material, including at the folding or creasing pattern.

The invention further provides a process for minimizing or diminishing transmission of water vapors through a folding or a creasing pattern imposed in a blank or a packaging material by compression or creasing, the process comprises forming a blank of a packaging material comprising at least one wax, at least one modified wax and/or latex, said blank having a preselected water vapor barrier property and mechanically forming a folding or a creasing pattern, wherein subsequent to the mechanical forming of the pattern, the preselected barrier property is maintained throughout the surface of the blank or packaging material, including at the folding or In some embodiments, the preselected barrier property is achievable by:

(i) mixing the at least one wax, the at least one modified wax, the latex or mixtures thereof with a blank composition in a process for manufacturing the blank; or (ii) forming a layer or a film of the at least one wax, the at least one modified wax or the lates or mixtures thereof on a surface of a blank absent of the preselected barrier property.

Also provided is a process for improving water vapor transmission rate (WVTR) of a paper or a paper-based blank having at least one folding or creasing pattern, the process comprises prior to forming the pattern forming a paper or a paper-based blank comprising at least one hydrophobic material selected from at least one wax, at least one modified wax, latex and mixtures thereof.

As known in the art, the folding or creasing pattern may be of a predefined shape or structure or size, enabling proper folding at predefined places of the blank or packaging material. Folding or creasing patterns may be formed on a blank having the predetermined barrier property by utilizing a creasing machine that is configured for generating one or more creases or folding lines in a film, sheet or board, or generally a blank to be folded. The creasing machine may be a device or a system which is either a standalone unit or is integrated into a larger machine or system such as a printing machine or a finishing machine. The folding or creasing pattern may be formed by locally applying a pressure onto the sheet. Creasing knives may be used to press onto the surface of the blank so as to generate the crease or folding pattern. Alternatively, the crashing device may be any compression body which utilizes mechanical force onto certain regions of the blank to cause deformations of various types in order to weaken the blank at the preselected region.

As disclosed herein, blanks of the invention maintain their barrier properties even at regions deformed or damaged due to mechanical treatments. The barrier properties include low water-vapor transmittance rate (WVTR) and low oxygen transmittance rate (OTR). Generally, WVTR values can be divided into the following performance ranges:

Low barrier—WVTR>100 gr/m$^2$·day,

Medium barrier—WVTR=25-100 (most of the barrier performances known in the art),

Good barrier—WVTR=10-25,

Very good barrier—WVTR=1-10 (as exhibited by films of the invention),

Excellent barrier—WVTR<1 (achieved mostly by utilizing aluminum sheets or thick plastic layers).

As demonstrated in Table 1 below, a paraffin coating, or a latex coating on a paper blank resulted in a very low water vapor barrier performance (Samples 1 and 2). The WVTR values did not improve when the paper blank was coated on an oxygen barrier layer. However, a paraffin-latex emulsion, led to an improvement of more than an order of magnitude in the performance (Sample 3). Commercial products based on modified paraffin and waxes in general exhibited lower barrier performances than EVA-modified paraffin waxes (sample 4). A mixture of EVA-modified paraffin with latex, resulted in similar performance as compared to the performance demonstrated by the modified paraffin alone, at low coating weight (Sample 5), and showed better performance than EVA modified paraffin, when coated at higher coating weight (Samples 7, 8).

TABLE 1

Barrier performance of emulsions of the invention

| | Barrier | Coating weight (g/m$^2$) | WVTR (gr/m2 · day), measured at 38° C. and 90% RH | Comments |
|---|---|---|---|---|
| 1 | Paper blank coated with Paraffin wax | 4-7 | ~300 | |

TABLE 1-continued

Barrier performance of emulsions of the invention

| | Barrier | Coating weight ($g/m^2$) | WVTR (gr/m2 · day), measured at 38° C. and 90% RH | Comments |
|---|---|---|---|---|
| 2 | Paper blank coated with Latex | 4-7 | ~400 | |
| 3 | Paper blank coated with Paraffin wax mixed with latex | 4-7 | ~20 | Films according to the present invention |
| 4 | Paper blank coated with EVA-modified Paraffin | 4-7 | ~10 | Films according to the present invention |
| 5 | Paper blank coated with EVA-modified Paraffin mixed with latex | 4-7 | ~10 | Films according to the present invention |
| 6 | Paper blank coated with a Wax mixture, e.g., paraffin wax and soy wax | 4-7 | 6-8 | Films according to the present invention |
| 7 | Paper blank coated with EVA-modified Paraffin | 8-10 | 6 | Films according to the present invention |
| 8 | Paper blank coated with EVA-modified Paraffin mixed with latex | 8-10 | 4 | Films according to the present invention |

Thus, the invention generally provides the following aspects:

A non-metalized blank having at least one mechanically induced folding pattern, the blank comprising or being formed of at least one hydrophobic material and having a water vapor transmission rate (WVTR) that is substantially the same throughout the blank surface, including at the folding pattern, wherein the at least one hydrophobic material is selected from at least one wax, at least one modified wax, latex and mixtures thereof.

A non-metalized blank having at least one mechanically induced folding pattern, the blank comprising or being formed of at least one hydrophobic material and having a water vapor transmission rate (WVTR) that is between 1 and 20 $gr/m^2 \cdot day$, when measured at 38° C. and 90% relative humidity, at any point along the blank surface, including at the folding pattern, wherein the at least one hydrophobic material is selected from at least one wax, at least one modified wax, latex and mixtures thereof.

A non-metalized blank having at least one mechanically induced folding pattern and comprising at least one hydrophobic material selected from at least one wax, at least one modified wax, latex and mixtures thereof, the at least one hydrophobic material endowing said blank with a water vapor transmission rate (WVTR) between 1 and 20 $gr/m^2 \cdot day$, when measured at 38° C. and 90% relative humidity, wherein the WVTR is substantially the same throughout the blank surface, including at the folding pattern.

All blanks according to the invention may be for use as a packaging material.

All blanks according to the invention may be for use in manufacturing a packaging material intended for holding, containing or housing a material or an object in a packed or unpacked form.

All blanks according to the invention may have a folding pattern that is formed by mechanical compression or by displacing a portion of the material vertical to the plane of the blank, forming a groove or trough in the blank.

All blanks according to the invention may be selected from or may be a polymeric blank, a paper or paper-based blank, a polymer coated paper-based blank, a nanocellulose blank, a nanocellulose/polymer blank, a fabric-based blank, or a porous blank.

All blanks according to the invention may be paper-based blanks or coated paper-based blanks that are in a form of a paperboard.

All blanks according to the invention may be polymeric blanks composed of a polymeric material.

All blanks according to the invention may be of a polymeric material that is selected from polyethylene, polypropylene, polyvinyl alcohol, ethylene vinyl alcohol, polyamide, polystyrene, polylactic acid, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride and polycarbonate.

All blanks according to the invention may be of a polyester.

All blanks according to the invention may be of a polymeric material selected from polyethylene, polypropylene, polyester, polyvinyl alcohol, ethylene vinyl alcohol, polyamide, polystyrene, polylactic acid, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride and polycarbonate, or any blend of two or more thereof.

All blanks according to the invention may be paper blanks or paper-based blanks.

All blanks according to the invention may be fabric-based blanks.

All blanks according to the invention may be fabric blanks made of textile, natural fabric, synthetic fabric, knit, woven material, nonwoven material or a mesh of a material selected from cellulose, viscose, glass fibers, carbon fibers or synthetic fibers.

All blanks according to the invention may be formed of a bulk material and an amount of the hydrophobic material.

All blanks according to the invention may be polymeric blanks, paper or paper-based blanks, polymer coated paper-based blanks, nanocellulose blanks, nanocellulose/polymer blanks, fabric-based blanks, or porous blanks comprising an amount of the at least one wax, and/or the at least one modified wax and/or the latex.

All blanks according to the invention may comprise the at least one hydrophobic material when embedded or mixed or intercalated in the blank during manufacturing.

All blanks according to the invention may be paper blanks or paper-based blanks, wherein the hydrophobic material is embedded or mixed or intercalated in the paper or paper-based blank during a paper manufacturing process.

All blanks according to the invention may be formed in a paper manufacturing process which comprises treating a pulp composition configured or selected for use in making a paper blank with at least one wax, at least one modified wax, latex or mixtures thereof.

All blanks according to the invention may be formed when the at least one wax, at least one modified wax, latex or mixtures thereof is added to the pulp composition by casting, spraying, or coating.

All blanks according to the invention may be formed when the paper-manufacturing process comprises associating or attaching a pulp composition to a substrate.

All blanks according to the invention may have at least one hydrophobic material as a layer or a film provided onto a surface of the material blank.

All blanks according to the invention may be formed by coating a substrate blank with a layer or a film comprising at least one wax, at least one modified wax, latex or mixtures thereof and mechanically forming the folding or creasing pattern on the blank.

All blanks according to the invention may have a layer or film of at least one wax, at least one modified wax, latex or mixtures thereof with a thickness corresponding to a weight value of between 3 and 13 $g/m^2$.

All blanks according to the invention may be in a form of a multilayered structure, wherein the layer or film of the at least one wax, at least one modified wax, latex or mixtures thereof forms a layer in the multilayered structure.

All blanks according to the invention may comprise the at least one wax that is a long chain ester product of a long chain alcohol and a fatty acid.

All blanks according to the invention may comprise a wax that is a long chain ester is derived from an alcohol having at least 12 carbon atoms.

All blanks according to the invention may comprise the at least one wax that is a paraffin wax.

All blanks according to the invention may comprise the at least one wax that is selected from carnauba wax, vegetable wax, beeswax, coconut wax, Candelilla wax, and soy wax.

All blanks according to the invention may comprise at least one wax that is a mixture of two or more waxes.

All blanks according to the invention may comprise at least one modified wax that is a conjugate of at least one wax material and at least one functional material.

All blanks according to the invention may comprise at least one modified wax that is a conjugate of a functional material selected from hydrocarbons, polysaccharides, proteins, amino acids, aliphatic materials, lipids, acrylic polymers, thermoplastic polymers, and polyolefin polymers.

All blanks according to the invention may comprise a modified wax where the functional material is a polymer.

All blanks according to the invention may comprise a modified wax wherein the functional material is a polymer selected from ethylene-vinyl acetate (EVA), polyethylene (PE), polypropylene (PP), polycarbonate (PC), polyethylene oxide (PEO), or ethylene acrylic acid (EAA).

All blanks according to the invention may comprise at least one modified wax that is EVA-modified wax.

All blanks according to the invention may comprise EVA-modified wax that is EVA-modified paraffin wax.

All blanks according to the invention may comprise at least one wax, or at least one modified wax, wherein the at least one wax, or at least one modified wax is mixed in the blank composition or is provided as a film on the blank.

All blanks according to the invention may comprise latex, wherein the latex is mixed in the blank composition or is provided as a film on the blank.

All blanks according to the invention may comprise at least one wax and/or at least one modified wax and latex, wherein the at least one wax, and/or at least one modified wax and latex are mixed in the blank composition or are provided as a film on the blank.

All blanks according to the invention may comprise two or more or a mixture of waxes, wherein the two or more waxes are mixed in the blank composition or are provided as a film on the blank.

In some embodiments, a blank of the invention is a paper-based blank comprising a sheet of a dry pulp composition and the at least one hydrophobic material.

All blanks according to the invention may be paper-based blanks comprising a sheet of a dry pulp composition and a layer of the at least one hydrophobic material.

All blanks according to the invention may be paper-based blanks comprising a sheet of a dry pulp composition and the at least one hydrophobic material and a layer of the at least one hydrophobic material, wherein the at least one hydrophobic material present in the pulp composition and the at least one hydrophobic material present in the layer are same or different.

All blanks according to the invention may comprise at least one hydrophobic material present in the pulp composition and at least one hydrophobic material present in the layer such that both are the same, selected from at least one wax, or at least one modified wax or latex.

All blanks according to the invention may comprise at least one hydrophobic material present in the pulp composition and at least one hydrophobic material present in the layer such that they are different, each independently selected from at least one wax, at least one modified wax or latex.

A process for manufacturing a blank or a packaging material having at least one folding or creasing pattern, the process comprising forming a blank or a packaging material comprising at least one wax, at least one modified wax and/or latex, said blank having preselected barrier properties; and mechanically forming said folding or creasing pattern on a surface region of the blank or a packaging material, wherein following the mechanical forming of the pattern, the preselected barrier properties are maintained throughout the surface of the blank or packaging material, including at the folding or creasing pattern.

A process for maintaining at least one barrier property of a blank or a packaging material having preselected barrier properties at a time prior to forming a folding or creasing pattern in the blank or packaging material, the process comprising forming a blank or a packaging material comprising at least one wax, at least one modified wax and/or latex, the blank or packaging material having preselected barrier properties, and mechanically forming said folding or creasing pattern, wherein subsequent to the mechanical forming of the pattern, the preselected barrier properties are maintained throughout the surface of the blank or packaging material, including at the folding or A process for minimizing or diminishing transmission of water vapors through a folding or a creasing pattern imposed in a blank or a packaging material by compression or creasing, the process comprises forming a blank of a packaging material comprising at least one wax, at least one modified wax and/or latex, said blank having a preselected water vapor barrier property and mechanically forming a folding or a creasing pattern, wherein subsequent to the mechanical forming of the pattern, the preselected barrier property is maintained throughout the surface of the blank or packaging material, including at the folding or creasing pattern.

In processes of the invention, the barrier property may be WVTR.

In processes of the invention, the preselected barrier property may be achievable by:

(i) mixing the at least one wax, the at least one modified wax, the latex or mixtures thereof with a blank composition in a process for manufacturing the blank; or (ii) forming a layer or a film of the at least one wax, the at least one modified wax or the lates or mixtures thereof on a surface of a blank absent of the preselected barrier property.

In processes of the invention, the at least one wax, at least one modified wax, latex or mixtures thereof is provided in a formulation or an emulsion further optionally comprising at least one additive.

In processes of the invention, the at least one additive is a surfactant, a salt, an adhesive, an emulsifier, a stabilizer, a pH stabilizer, an anti-blocking agent, a defoamer, a colorant, clay, a cellulosic material, a polymer, lignin, starch, and Shellac.

A process for improving water vapor transmission rate (WVTR) of a paper or a paper-based blank having at least one folding or creasing pattern, the process comprises prior to forming the pattern forming a paper or a paper-based blank comprising at least one hydrophobic material selected from at least one wax, at least one modified wax, latex and mixtures thereof.

A non-metalized packaging material formed of a non-metalized blank, the packaging material having one or more panels or faces foldable along at least one mechanically induced folding pattern, the packaging material having a water vapor transmission rate (WVTR) that is substantially constant throughout the material surface including at the folding pattern, wherein the blank comprises or is formed of at least one hydrophobic material selected from at least one wax, at least one modified wax, latex and mixtures thereof.

A non-metalized packaging material having one or more panels or faces foldable along at least one mechanically induced folding pattern, the packaging material being formed of a material comprising at least one wax, at least one modified wax, latex and mixtures thereof, wherein the packaging material having a water vapor transmission rate (WVTR) that is substantially constant throughout the material surface including at the folding pattern.

A pulp composition for use in paper production, the composition comprising pulp and at least one wax, at least one modified wax, latex or mixtures thereof.

A paper sheet or a paper product or a paper blank formed from a composition according to the invention.

DETAILED DESCRIPTION OF EMBODIMENTS

Experimental

EVA modified Paraffin synthesis: Paraffin, and EVA were melted together at 90° C. The mixture was stirred at 800 RPM using a propeller stirrer, until homogeneous mixture was obtained.

Emulsion preparation: Two emulsification systems were tested. Both systems were formulated in a hot water bath (80° C.)

System 1 a. Modified paraffin and emulsifier mixtures were stirred at 250 RPM.

b. Hot water was added in intervals until a total amount of desired water was added. During the water addition the mixture was stirred at 800 RPM.

c. During the addition of water, W/O emulsion was created. At a certain amount of water, the viscosity drops, and an O/W emulsion was created.

d. Optionally, the emulsion may be sonicated for 30 s.

e. The resulted suspension was a white, stable water suspension.

System 2 a. Modified paraffin and stearic acid, as emulsifier, were stirred at 250 RPM.

b. After clear melt was obtained, hot water was added in intervals until total amount of desired water was added. During the water addition the mixture was stirred at 800 RPM.

c. After the addition of water, TEA (triethanolamine) was added. The mixture then became completely white.

d. Cooling the emulsion to around 30° C., at which temperature stirring was stopped.

e. The resulted suspension was a white, stable water suspension.

Characteristics:

The emulsions were found stable and slight sedimentations could be fixed with short mixing. The viscosity of the emulsions was between 100 and 1000 cPs. Also, the emulsions could be coated using conventional coating machinery (gravure, flexo, slot-die, rod, etc.) and by using spray and dip coating on a variety of substrates.

Coating:

Both emulsions were applied, using a rod coater, on different papers, precoated with an OTR barrier layer(s) and on uncoated papers. The coating thickness varied between 12 and 40 um (wet). The paper was then dried for 15 min in 90° C.

The resulting dry coating weight was between 1-8 g/m$^2$.

Water vapor permeability was as followed:

All paper samples were tested according to known standards (ASTM F1249-13 and F3299-18) at 90% RH and 38° C.

WVTR results are as described in Table 1

Preparation of a Barrier Emulsion With 40 wt %:

PE modified paraffin wax was melted together with stearic acid (10% of the wax) at 75° C. under continuous stirring. Thereafter, hot water was added in intervals, following by addition of KOH until a pH of 8 was reached.

The emulsion was then cooled to 50° C. 40% modified wax emulsion was mixed with 40% latex emulsion at a ratio of 1:2 to obtain a stable, white suspension.

Preparation of a Barrier Emulsion With 35 wt % and High Sustainable Material Content:

EVA modified vegetable wax was prepared by reacting the wax with EVA in a similar way as the preparation of EVA modified paraffin wax. EVA modified vegetable wax was melted together with carnauba wax and oleic acid (30% of the wax). Hot water was then added in intervals, followed by the addition of triethanolamine (3% of all solids).

The emulsion was subsequently cooled to 50° C. and 40% wax emulsion was mixed with 40% latex emulsion at a ratio of 1:3 and water and lignin were added in order to reach a solid content of 35%.

The final sustainable materials content in the emulsion was 40%.

Preparation of a Barrier Emulsion with 40 wt % and 51% Renewable Content:

Wax based emulsion was mixed with soy wax-based emulsion with 1:1 ratio (solid content wise). The soy wax emulsion contains 100% renewable material. Water was added to get 40 wt %. the final emulsion contains 51% renewable content Coating Paper with Crease:

Paper with and without an OTR layer were coated with different formulation of the invention. After drying for 15 min in 90° C., the coated papers were creased, using a creasing device. Creased samples were evaluated for their WVTR performance, and it was shown that the WVTR results remained the same as shown in Table 1 (~15 g/m$^2$*day). In addition, testing for oil penetration, it was observed that coating of paper with suspensions of the invention lead to significantly lower penetration of oil after creasing.

Applications:

The modified wax/latex barrier formulation with a viscosity of 150 cP and a solid content of 40% was applied on a kraft paper reel that was previously coated with an OTR layer. The application was conducted using a gravure printing machine. The coating speed was 100 m/min and the wet coating weight was 12 g/m$^2$. The coated paper was dried at 120° C. and the resulted dry coating weight was ~5 g/m$^2$.

The resulting paper showed excellent water vapor barrier performance (WVTR=11 gr/m$^2$/day @ 38° C., 90% RH) and oxygen barrier performance (OTR=2.3 ml/m$^2$/day @ 23° C., 70% RH). It also showed very low water absorption (COBB60=0.6 g/m$^2$) and high oil resistance (KIT 12).

Manufacturing of paper blanks: Bleached or unbleached pulp is prepared and may be further refined to cut the fibers and roughen the surface of the fibers to enhance formation and bonding of the fibers as they enter the paper machine. Water is added to the pulp slurry to make a thin mixture normally containing less than 1% fiber. At this stage it is possible to add a formulation of the invention. The dilute slurry is then cleaned in cyclone cleaners and screened in centrifugal screens before being fed into the 'wet end' of the paper-forming machine (it is being dewatered). After this stage it is also possible to add the formulation.

From this stage the slurry undergoes the final processing, determining whether the product will be paper or pulp tissue for molding/other pulp uses. A formed pulp tissue can be sprayed with the formulation before molding, creating barrier in the substrate. Final weight of the formed substrate (paper/pulp mold) may vary between 30-1000 (g/m$^2$).

Molding process: The molding process of pulp to obtain molded products is mainly through a series of methods such as vacuum molding and grouting molding, so that the raw pulp fibers are formed into the shape designed by the mold, and vacuum molding is the most commonly used and most effective one. The drying process mainly uses fuel, oil, gas, electricity or steam, heat transfer oil or other media as a heat source, heating air, drying the pulp molded products in the hot air, and extracting evaporated water from the products through a fan accelerates the drying effect. After the pulp product is shaped and dried, it is basically shaped, and then heated with an electric heating plate or other heating medium (such as heat transfer oil) to make the pulp product mold have a higher temperature (150-250° C.), and then use air pressure or hydraulic pressure, thus the paper support product is pressed under high temperature and high pressure to make the product appearance neat and beautiful, achieve better toughness, and make it have better shock resistance.

Alternatively to molding, other techniques may be used for preparing products of the invention may be or may include various deposition methods, structuring methods and film forming methods. Injection molding or other injection techniques are exemplary alternative methods.

Example 1

Oxygen barrier formulation was added to a pulp mixture of 80% hardwood/20% softwood pulp–10% of the pulp weight. Cationic starch was added as a retention aid. The formula was added to the first stage of the pulp mixture, before dewatering of the mixture. Assumingly in this stage the loading of the formula onto the cellulosic fibers should be best. The paper making procedure was continued until a final paper was produced. The paper weight was 90 g/m$^2$, and the resulting paper showed oxygen barrier performance (OTR=10 ml/m$^2$*day @ 70% RH).

Example 2

Water vapor barrier formula was added to a pulp mixture of 75% hardwood/25% softwood pulp–15% of the pulp weight. The formula was added to the first stage of the pulp mixture, before dewatering of the mixture. The paper making procedure was continued until a final paper was produced. The paper weight was 65 g/m$^2$, and the resulting paper showed water barrier performance (WVTR=25 ml/m$^2$*day @ 90% RH, 38° C.) and also reduced water absorption compared to neat paper (COBB60=10 gr/m$^2$).

Example 3

Oxygen barrier formulation was added to a pulp mixture of 80% hardwood/20% softwood pulp–10% of the pulp weight. Cationic starch was added as a retention aid before formula addition. The formula was added to the first stage of the pulp mixture, before dewatering of the mixture. Assumingly in this stage the loading of the formula onto the cellulosic fibers should be best. The pulp mixture was molded in a wet formed fiber process, to produce complex structures such as trays and paper bottles. The molded pulp showed oxygen barrier performance (OTR=10 ml/m$^2$*day @ 70% RH), and its weight was 200 g/m$^2$.

The invention claimed is:

1. A non-metalized blank having at least one mechanically induced folding pattern, the blank comprising or being formed of at least one hydrophobic material and having a water vapor transmission rate (WVTR) that is between 1 and 20 gr/m$^2$·day, when measured at 38° C. and 90% relative humidity, at any point along the blank surface, including at the folding pattern, wherein the at least one hydrophobic material is selected from at least one wax, at least one modified wax, latex and mixtures thereof.

2. The blank according to claim 1, having at least one mechanically induced folding pattern and comprising at least one hydrophobic material selected from at least one wax, at least one modified wax, latex and mixtures thereof, the at least one hydrophobic material endowing said blank with a water vapor transmission rate (WVTR) between 1 and 20 gr/m$^2$·day, when measured at 38° C. and 90% relative humidity, wherein the WTR is substantially the same throughout the blank surface, including at the folding pattern.

3. The blank according to claim 1, wherein the blank is a polymeric blank, a paper or paper-based blank, a polymer coated paper-based blank, a nanocellulose blank, a nanocellulose/polymer blank, a fabric-based blank, or a porous blank.

4. The blank according to claim 3, wherein the paper-based blank or coated paper-based blank is a paperboard.

5. The blank according to claim 3, wherein the blank is a polymeric blank composed of a polymeric material.

6. The blank according to claim 5, wherein the polymeric material is selected from polyethylene, polypropylene, polyvinyl alcohol, ethylene vinyl alcohol, polyamide, polystyrene, polylactic acid, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride and polycarbonate.

7. The blank according to claim 5, wherein the polymeric material is polyester.

8. The blank according to claim 5, wherein the polymeric material is selected from polyethylene, polypropylene, polyester, polyvinyl alcohol, ethylene vinyl alcohol, polyamide, polystyrene, polylactic acid, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride and polycarbonate, or any blend of two or more thereof.

9. The blank according to claim 3, wherein the blank is a paper blank or a paper-based blank.

10. The blank according to claim 1, being in a form of a multilayered structure, wherein the layer or film of the at least one wax, at least one modified wax, latex or mixtures thereof forms a layer in the multilayered structure.

11. The blank according to claim 1, wherein the blank comprises the at least one wax, or the at least one modified wax, and wherein the at least one wax, or at least one modified wax is mixed in the blank composition or is provided as a film on the blank.

12. The blank according to claim 1, being a paper-based blank comprising a sheet of a dry pulp composition and a layer of the at least one hydrophobic material.

13. The blank according to claim 1, being a paper-based blank comprising a sheet of a dry pulp composition and the at least one hydrophobic material and a layer of the at least one hydrophobic material, wherein the at least one hydrophobic material present in the pulp composition and the at least one hydrophobic material present in the layer are same or different.

14. A non-metalized packaging material formed of a non-metalized blank, the packaging material having one or more panels or faces foldable along at least one mechanically induced folding pattern, the packaging material having a water vapor transmission rate (WVTR) that is substantially constant throughout the material surface including at the folding pattern, wherein the blank comprises or is formed of at least one hydrophobic material selected from at least one wax, at least one modified wax, latex and mixtures thereof.

15. A process for manufacturing a blank or a packaging material having at least one folding or creasing pattern, the process comprising forming a blank or a packaging material comprising at least one wax, at least one modified wax and/or latex, said blank having preselected barrier properties; and mechanically forming said folding or creasing pattern on a surface region of the blank or a packaging material, wherein following the mechanical forming of the pattern, the preselected barrier properties are maintained throughout the surface of the blank or packaging material, including at the folding or creasing pattern wherein the blank has a water vapor transmission rate that is between 1 and 20 $gr/m^2 \cdot day$, when measured at 38° C. and 90% relative humidity, at any point along the blank surface, wherein the packaging material has a water vapor transmission rate that is substantially constant throughout the material surface including at the folding pattern.

16. A process for maintaining at least one barrier property of a blank or a packaging material having preselected barrier properties at a time prior to forming a folding or creasing pattern in the blank or packaging material, the process comprising forming a blank or a packaging material comprising at least one wax, at least one modified wax and/or latex, the blank or packaging material having preselected barrier properties, and mechanically forming said folding or creasing pattern, wherein subsequent to the mechanical forming of the pattern, the preselected barrier properties are maintained throughout the surface of the blank or packaging material, including at the folding or creasing pattern wherein the blank has a water vapor transmission rate that is between 1 and 20 $gr/m^2 \cdot day$, when measured at 38° C. and 90% relative humidity, at any point along the blank surface, wherein the packaging material has a water vapor transmission rate that is substantially constant throughout the material surface including at the folding pattern.

17. The process according to claim 16, wherein the barrier property is WVTR.

18. The process according to claim 16, wherein the preselected barrier property is achievable by:
(i) mixing the at least one wax, the at least one modified wax, the latex or mixtures thereof with a blank composition in a process for manufacturing the blank; or
(ii) forming a layer or a film of the at least one wax, the at least one modified wax or the lates or mixtures thereof on a surface of a blank absent of the preselected barrier property.

19. The process according to claim 16, wherein the at least one wax, at least one modified wax, latex or mixtures thereof is provided in a formulation or an emulsion further optionally comprising at least one additive.

20. A process for minimizing or diminishing transmission of water vapors through a folding or a creasing pattern imposed in a blank or a packaging material by compression or creasing, the process comprises forming a blank of a packaging material comprising at least one wax, at least one modified wax and/or latex, said blank having a preselected water vapor barrier property and mechanically forming a folding or a creasing pattern, wherein subsequent to the mechanical forming of the pattern, the preselected barrier property is maintained throughout the surface of the blank or packaging material, including at the folding or creasing pattern wherein the blank has a water vapor transmission rate that is between 1 and 20 $gr/m^2 \cdot day$, when measured at 38° C. and 90% relative humidity, at any point along the blank surface, wherein the packaging material has a water vapor transmission rate that is substantially constant throughout the material surface including at the folding pattern.

* * * * *